(12) United States Patent
Solland et al.

(10) Patent No.: US 10,117,485 B2
(45) Date of Patent: Nov. 6, 2018

(54) RECEPTACLE WITH PIVOTING CLOSURE

(71) Applicants: Kurt Solland, Goodyear, AZ (US); Debora Monzelowsky, Goodyear, AZ (US)

(72) Inventors: Kurt Solland, Goodyear, AZ (US); Debora Monzelowsky, Goodyear, AZ (US)

( * ) Notice: Subject to any disclaimer, the term of this patent is extended or adjusted under 35 U.S.C. 154(b) by 172 days.

(21) Appl. No.: 14/790,054

(22) Filed: Jul. 2, 2015

(65) Prior Publication Data

US 2017/0001769 A1 Jan. 5, 2017

(51) Int. Cl.
*B65D 45/00* (2006.01)
*A45C 11/00* (2006.01)
*H02G 11/00* (2006.01)
*H02J 7/00* (2006.01)
*A45C 11/04* (2006.01)

(52) U.S. Cl.
CPC .............. *A45C 11/00* (2013.01); *H02G 11/00* (2013.01); *H02J 7/0045* (2013.01); *A45C 11/04* (2013.01); *B65H 2701/39* (2013.01)

(58) Field of Classification Search
CPC ........ B65D 43/18; B65D 43/22; B65D 85/67; B65D 85/672; B65D 85/676; B65H 75/02; H02J 7/0045
USPC .......................... 206/389, 398, 408; 220/252
See application file for complete search history.

(56) References Cited

U.S. PATENT DOCUMENTS

| | | | |
|---|---|---|---|
| 391,145 A | 10/1888 | Hardin | |
| D27,622 S | 9/1897 | Zoerb | |
| D30,045 S | 1/1899 | Guyer | |
| D110,442 S | 3/1938 | Pratt | |
| D133,503 S | 12/1941 | Stene | |
| D333,560 S | 3/1993 | Miyashita et al. | |
| 5,615,765 A | 4/1997 | Roericht | |
| 5,887,720 A * | 3/1999 | Lin | H04R 1/10 206/38 |
| D411,347 S | 6/1999 | Newcomer | |
| D417,541 S | 12/1999 | Conway | |
| D430,444 S | 9/2000 | Allsop et al. | |
| D437,112 S | 2/2001 | Toffoli | |
| D439,376 S | 3/2001 | Lerolle | |
| D442,993 S | 5/2001 | Eisen | |
| D453,993 S | 3/2002 | Diltoer | |
| D466,940 S | 12/2002 | Gstalder | |
| D472,377 S | 4/2003 | Tabacchi | |
| 6,600,479 B1 | 7/2003 | Smith et al. | |

(Continued)

OTHER PUBLICATIONS

Office Action dated Mar. 10, 2017 in U.S. Appl. No. 29/532,170.

(Continued)

*Primary Examiner* — Steven A. Reynolds
*Assistant Examiner* — Javier A Pagan
(74) *Attorney, Agent, or Firm* — Plumsea Law Group, LLC

(57) ABSTRACT

A receptacle providing secure protection for its contents and comprising a housing with an opening, and a cover member pivotably attached to the housing to move between a closed position and an opened position. In the closed position, a locking mechanism may lock the housing and cover into engagement. In the open position, convenient access is provided to the interior of the housing and the contents. The cover member may be equipped with a retaining member for wrapping wires or cables in an organized fashion.

19 Claims, 19 Drawing Sheets

(56) References Cited

U.S. PATENT DOCUMENTS

| | | |
|---|---|---|
| D479,401 S | 9/2003 | Claypool |
| D485,680 S | 1/2004 | Hasenfrantz |
| D486,638 S | 2/2004 | Menceles |
| D495,956 S | 9/2004 | Martinez |
| D511,895 S | 11/2005 | Vish et al. |
| 6,966,791 B1 | 11/2005 | Farr |
| 7,032,854 B2 | 4/2006 | Marsden |
| 7,106,301 B2 | 9/2006 | Smith et al. |
| 7,140,511 B2 | 11/2006 | Baker et al. |
| 7,195,414 B2 | 3/2007 | Altonen et al. |
| D544,712 S | 6/2007 | Au |
| 7,381,005 B2 | 6/2008 | Altonen et al. |
| D612,595 S | 3/2010 | McCurdy |
| 8,167,102 B2* | 5/2012 | Skillman .............. B65H 75/143 191/12.2 R |
| D671,367 S | 11/2012 | Shah |
| D690,055 S | 9/2013 | Chen |
| 8,528,789 B2 | 9/2013 | Ramsey et al. |
| 8,540,113 B2 | 9/2013 | Bailey |
| 8,714,358 B2* | 5/2014 | Debitzky .............. H04R 1/1033 206/409 |
| D714,549 S | 10/2014 | Levy et al. |
| D716,549 S | 11/2014 | Porter |
| 9,426,910 B1 | 8/2016 | Lee |
| D767,889 S | 10/2016 | Szal |
| 2006/0006038 A1 | 1/2006 | Beverlin |
| 2013/0037545 A1* | 2/2013 | Valley, III .............. B65D 43/20 220/345.2 |
| 2016/0166027 A1 | 6/2016 | Godart |

OTHER PUBLICATIONS

Ex Quayle Office Action dated Nov. 18, 2016 in U.S. Appl. No. 29/532,182.

Office Action dated May 31, 2016 in Japanese Patent Application No. 2015-029340.

Notice of Allowance dated Oct. 5, 2016 in Japanese Patent Application No. 2015-029340.

Office Action dated Jul. 27, 2016 in Japanese Patent Application No. 2015-029341.

Notice of Allowance dated Nov. 16, 2016 in Japanese Patent Application No. 2015-029341.

* cited by examiner

RECEPTACLE WITH PIVOTING CLOSURE

BACKGROUND OF THE INVENTION

The present invention relates to receptacle with a pivoting closure configured for storing articles to ensure the articles remain protected and secure from the environment. The receptacle may be particularly useful for containing small articles, and articles with cords.

A variety of receptacles and cases are available for managing the use of different types of articles. Many existing receptacles and cases are variations of a traditional box with a mating lid, or a jar with mating lid. Sometimes the lid is separate, and sometimes the lid is attached to the box or jar by a hinge. There may be a fastener device between to secure the lid to the box such as a threaded fastener, or locking tabs, or the like. Other existing receptacles are variations of a clamshell configuration where two halves come together at a seam that is joined by a zipper, a hook and loop fastener or another type of fastener. Another typical receptacle for small articles has an envelope or pouch configuration with a closure that may involve a seam closure such as a zipper or a zip top; a cinch closure; or a folded over flap closure that could be secured to the body of the envelope with a fastener such as a snap, hook and loop, or hook and eye or the like.

While useful for holding many types of articles, these typical receptacles do not always provide a convenient way to store and carry certain types of articles. With the proliferation of personal electronic devices that a typical person may use and need to manage and carry, there is a continuing need for a secure way to stow the accessories required for personal electronic devices. Many of these accessories are corded or require cords when in use or charging, and many users struggle with the spaghetti-like tangle of various cords in their pockets, vehicles, everyday carry bag or travel bag.

SUMMARY OF THE INVENTION

The receptacle described herein provides for secure protection of its contents and convenient access to the contents. The receptacle has a closure with a haptic response to either opening or closing and ensures that when closed, the shape of the receptacle is convenient to stow in a pocket, a bag or to be displayed. The receptacle has a shape and configuration that biases the receptacle closed when it is being stowed in a pocket or bag so that it cannot accidentally open. The receptacle has an aesthetically pleasing form and feel to enhance its function and usability.

In one aspect, the receptacle comprises a generally cylindrical housing with open ends and a cover member having first and second portions connected to one another by a connecting member. The cover member is attached to the housing so as to move between a closed position in which the open ends of the housing are closed off by the first and second portions of the cover, and an opened position in which the connecting member of the cover is exposed and one of the open ends of the housing is not closed off by the cover. The receptacle also may be provided with a locking structure provided between the housing and the cover for locking the cover of the receptacle in the closed position or the open position. The opened position provides convenient access to the interior of the housing and the contents.

In another aspect, the receptacle comprises a housing with an access opening at an end and a cover pivotably connected to the housing to cover the access opening and move from a closed position to an opened position. The cover may have opposing flanges provided with a hinge mechanism to rotatably attach the cover to the housing. A locking mechanism may also be provided for locking engagement of the cover to the housing in either the opened or closed position. The hinge mechanism may comprise a pivot pin and mating aperture cooperating between the housing and the cover. The hinge mechanism may be provided integrally to the opposing flanges of the cover.

In yet another aspect, the receptacle comprises a housing with an access opening and a cover pivotably attached to the housing with the cover comprising a plurality of segments in overlapping and layered relation to one another. When the cover is in the closed position, the segments overlap a lesser amount than when the cover is in the opened position. The housing and cover may be connected by pin and mating aperture arrangement, and may include a locking mechanism to retain the housing and cover in a locked opened or locked closed position.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

A receptacle generally comprises two main structures: a hollowed housing or shell member defining a cavity for holding an article, and a cover pivotably attached to the housing and engineered to provide a secure closure when closed, and easy access to the article when opened. The housing and cover are coupled together to pivot relative to one another to open and close the receptacle. When closed, the cover may be retained in the closed configuration by detents or other mechanical interference between the housing and cover. The cover may be retained in the closed position also by the shape and geometry of the closed receptacle, particularly as it relates to the environment into which it is placed.

There are numerous possible variations for the exact shape and scale of this receptacle depending on the intended use. A few exemplary embodiments are illustrated and described herein, and by no means are limiting of the claimed invention.

In one exemplary embodiment, the receptacle is designed for holding earbud headphones for a personal audio system or other electronic device such as a smartphone. Any user has experienced the frustration of thin, flexible earbud wires becoming bunched or tangled together when storing the earbuds in a pocket or bag. An ad hoc solution to this problem is to wind the earbud wires around the personal audio device or smartphone itself. This is unsatisfactory since use of the touchscreens on these devices is inhibited by the earbud wires crossing over the screen. Some conventional solutions to this well-known problem are to store them in a pouch or simply to wear the earbuds whether audio playback is ongoing or not. While these practices address some of the issues, they still suffer from the problems of potential tangling or fraying of the wires and connections, especially when stowed in pocket or bag with other devices and articles. Tangling or bunching the wires is more than a nuisance, since repeated handling in a disorganized manner can damage the earbuds. With the cost of high-end earbud headphones increasing, this is a not a trivial problem. In order to encourage consistent use of a stowage case, the case must be easy to use and functional. Many cases are discarded because they are too cumbersome to use or carry.

When referring to the figures, directional adjectives such as top, bottom, left, right or side are used for convenient reference to the illustrated embodiments in the illustrated orientations. These adjectives are used in a manner that provides internal consistency to the product, but it is understood that the directional adjectives may change as the item is moved through space in use or while stored.

Figure 3:
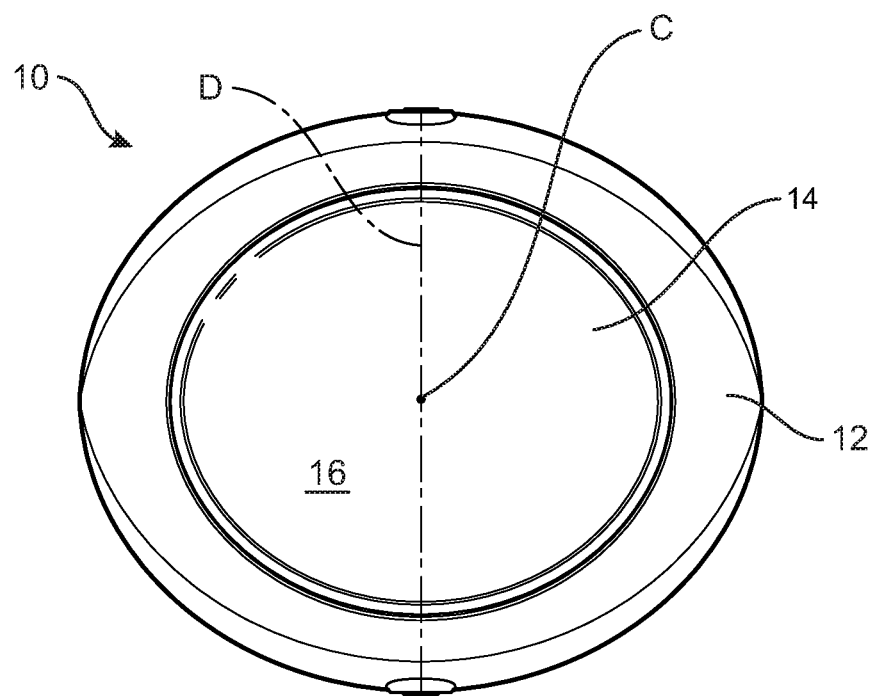
FIG. 3 is a top plan view of the receptacle of FIG. 1.
Figure 4:
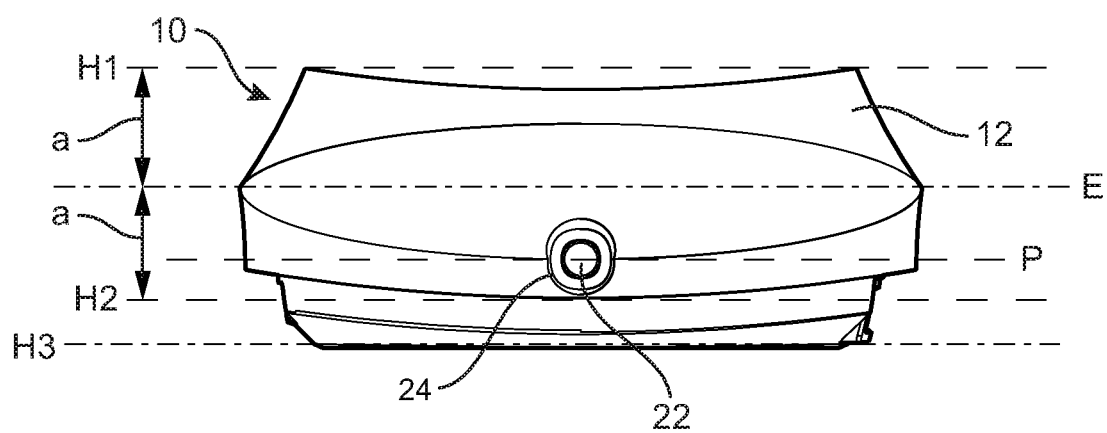
FIG. 4 is a front elevational view of the receptacle of FIG. 1.
Figure 5:
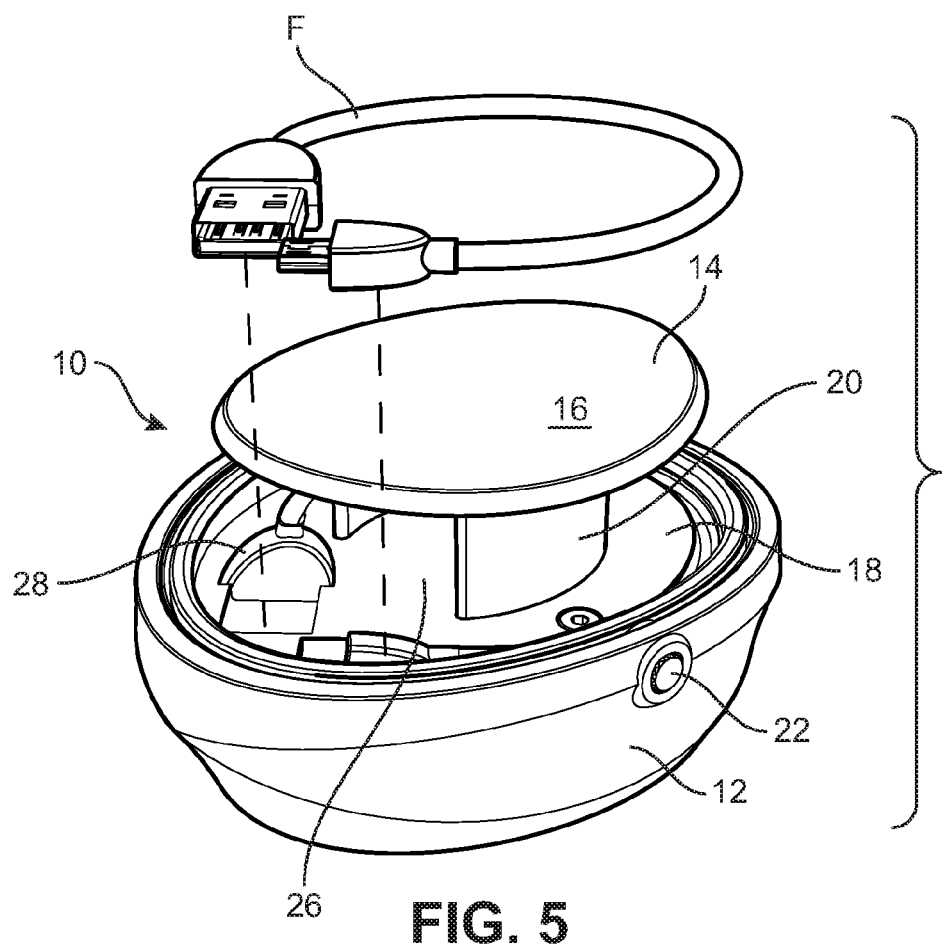
FIG. 5 is a perspective view of the receptacle of FIG. 1 shown in a fully opened configuration with an exemplary article.

In an earbud receptacle embodiment shown in FIGS. 1-14D, receptacle 10 comprises a housing 12 and a cover 14. FIGS. 1-4 and 6 illustrate receptacle 10 in a closed configuration. FIG. 5 illustrates receptacle 10 in a fully opened configuration. In this embodiment, housing 12 has a roughly cylindrical shell shape with top and bottom openings and cover 14 has opposing faces 16 and 18 connected to each other by a post 20. The term cylindrical is used herein to refer to the shape that may have a circular cross-section, an oval or racetrack cross-section, or an elliptical cross-section. Opposing faces 16 and 18 are shaped to cover and therefore close off the top and bottom openings in housing 12 when in a closed configuration. Cover member 14 is pivotably connected to housing 12 to enable the cover member 14 to move between the closed configuration and the opened configuration. The fully closed configuration is best seen in FIGS. 1-4, 6, 9, 10, 13A and 14A. When fully closed, receptacle 10 has a compact, easy to manipulate shape. Receptacle 10 is kept in the closed configuration by at least two factors: the shape and interaction of the housing and cover to one another; and by a mechanical closure described in detail herein.

Figure 11:
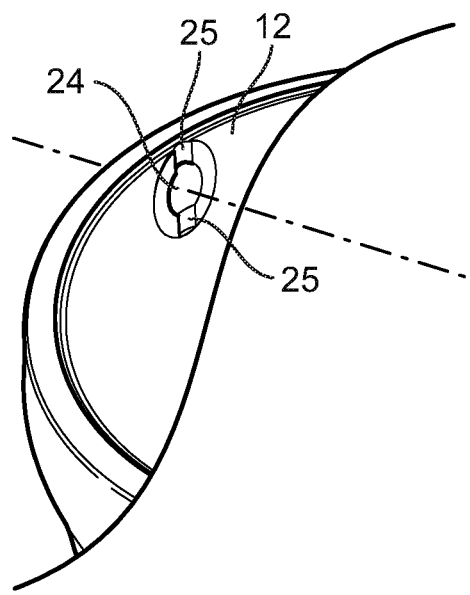
FIG. 11 is a cut-away perspective viewed along line A-A in FIG. 10 of a portion of the interior of the housing.
Figure 12:
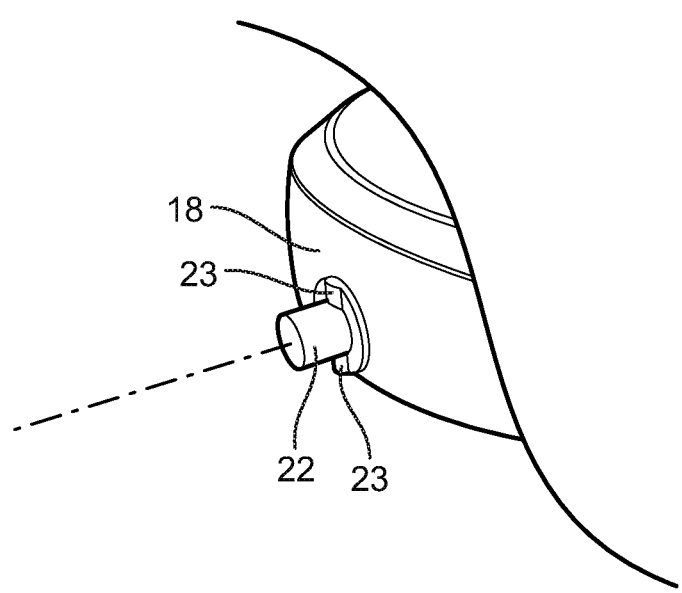
FIG. 12 is a cut-away perspective viewed along line B-B in FIG. 10 of a mating portion of the cover.

The pivoting relationship between housing 12 and cover member 14 may be enabled by pins 22 rotating in mating apertures 24. Pins 22 provided on cover member 14, and mating apertures 24 provided on housing 12. The pins may be integrally formed with the cover member, and apertures may be integrally formed with the housing. As best seen in FIGS. 11 and 12, a mechanical locking relationship may be provided between housing 12 and cover member 14 by providing detent protrusions 23 adjacent to each pin 22. Protrusions 23 are designed to engage mating detent recesses 25 provided adjacent to each aperture 24. Detent mechanism 23, 24 provides a user with sensory certainty that the receptacle is either in the fully closed or fully opened configuration. The arcuate shapes of the detent mechanism bias the housing and cover member toward the fully closed or fully opened position when any portion of protrusion 23 is in contact with recess 25. During pivoting movement of housing 12 with respect to cover member 14, when protrusion 23 contacts recess 25, these arcuate surfaces will tend to move these elements into the engaged position which corresponds to either the fully closed or fully opened configuration, that is, bias the detent protrusion and detent recess into fully engaged relationship. Once the detent mechanism is engaged, the user will be able to accurately and quickly sense that the receptacle is in the closed configuration or the opened configuration since in this embodiment those positions are 180 degrees of rotation apart. Although the detent mechanism illustrated in FIGS. 11 and 12 includes a protrusion and recess pair that provides a single detented position lock, it is also possible that a number of either protrusions or recesses may be provided of the same or varying depths to provide more than one detented position lock. For example, either a set of recesses or a set of protrusions could be provided in a 90 degree position relative to the illustrated set in order to provide a second detented position lock that is rotated 90 degrees from the fully closed position. Other possible shapes are possible for the detent mechanism, and the mating protrusion and recess maybe provided on the opposite elements. That is, the protrusion may be provided adjacent to the aperture, while the recess may be provided adjacent to the pin.

Figure 10:
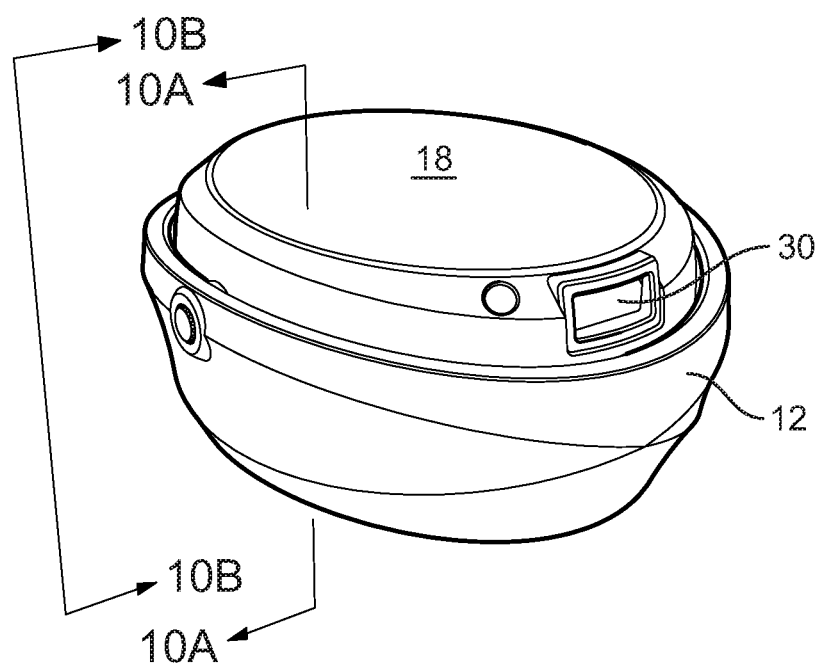
FIG. 10 is a bottom perspective view of the receptacle of FIG. 1.
Figure 10A:
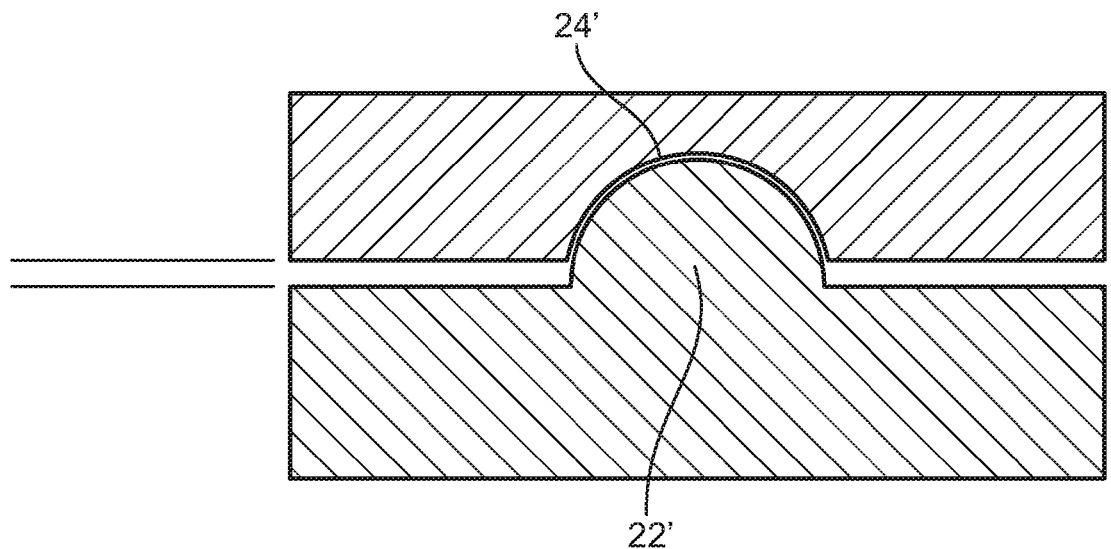
FIG. 10A is a schematic cross-section of a joint mechanism.
Figure 10B:
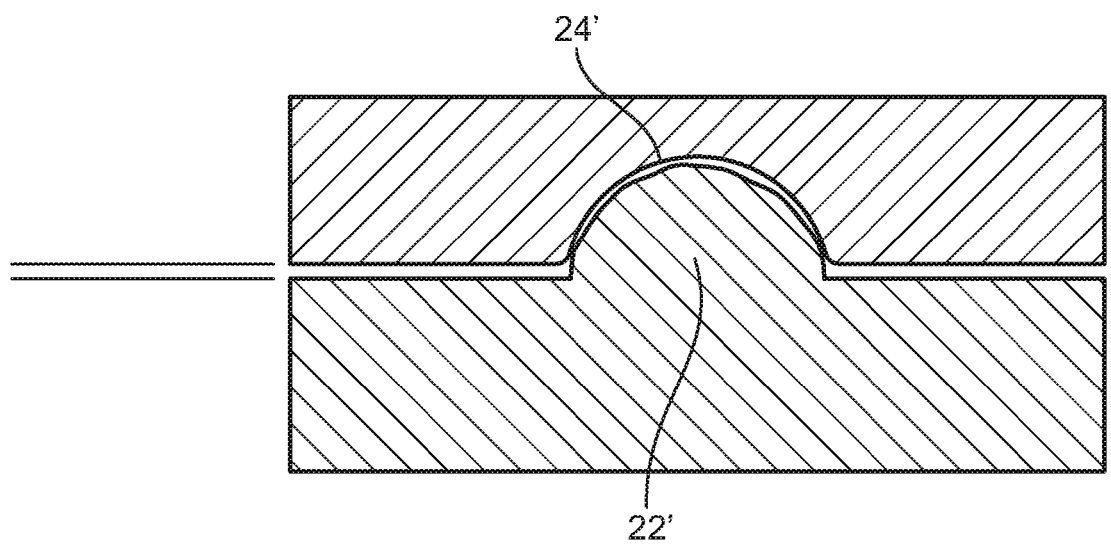
FIG. 10B is a schematic cross-section of the joint mechanism of FIG. 10A, illustrating wear.

An additional feature of the detent mechanism is its ability to self-adjust due to the resilience of the housing in response to hoop forces. The wear over time of a joint mechanism such as a detent and mating recess is shown schematically in FIGS. 10A and 10B. FIG. 10A is a schematic cross section of an alternative of a domed pin 22' and mating recess 24' relationship. FIG. 10B illustrates the same relationship after some wear due to use. The wear is illustrated schematically in FIG. 10B by a jagged surface on pin 22' which simulates what occurs due to repeated use on a plastic mechanism of this sort. The placement of the pins and recesses is designed to self-adjust as it wears because of the geometry of the housing and cover.

Although the illustrated embodiment shows the pins on cover member 14, and the apertures on housing 12, they may also be reversed. That is, the pins may be provided on housing 12, while the mating apertures may be provided on cover member 14. In this embodiment, pins 22 are diametrically aligned along a line D on cover member 14 through a center point C, and apertures 24 are diametrically aligned on housing 12 along the same line D and through same center point C. This configuration enables housing 12 to pivot with respect to cover member 14 along about line D. It is also within the scope of the invention to provide a different mechanical attachment which enables for a pivoting relationship between these parts.

In this embodiment, cover member 14 has a spindle-like shape due to cover face 16 and cover face 18 sandwiching post 20 in between them. The complete exposure and access to the contents of the receptacle are made possible by placing pins 22 on cover face 18 and mating apertures 24 on housing 12 offset from a horizontal midline E of the height of housing 12 as shown in FIG. 4. The reference lines in FIG. 4 include H1 indicating the top of housing 12, and H2, indicating the bottom of cover 12. Horizontal midline E of housing 12 is equidistant from H1 and H2, shown in FIG. 4 as a distance α. Another reference line H3 is labeled as the bottom of the receptacle, cover 18. The distance between H1 and H3 is therefore the height of the receptacle. In this illustrated embodiment, the positioning of the apertures 24 is configured along a reference line P, below midline E and above H2, and placed to mate with pins 22 on cover face 18 when the cover member is in the fully closed configuration. The pivot axis being offset from the midline E is what enables the entire spindle-like cover member to be exposed when rotated into the fully opened configuration.

Figure 7:
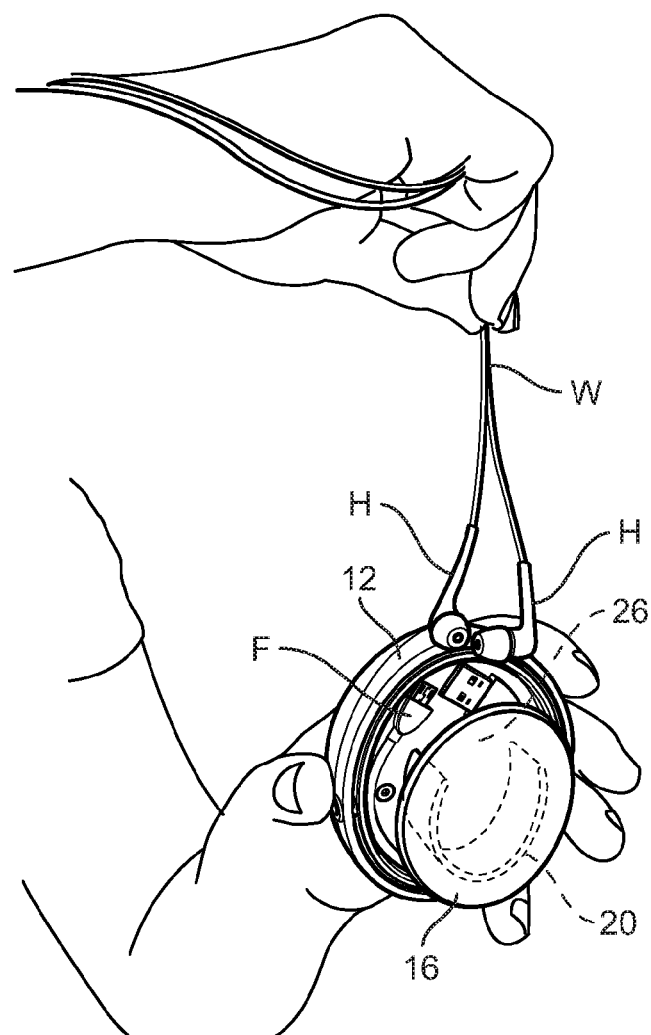
FIG. 7 is a schematic view of the receptacle of FIG. 1 shown in an opened configuration and being manipulated to stow an exemplary article.
Figure 8:
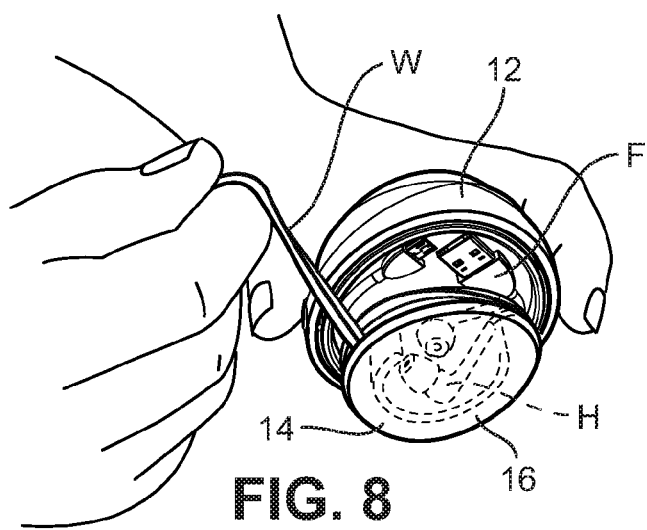
FIG. 8 is a schematic view of the receptacle of FIG. 5 demonstrating an exemplary configuration stowing a corded article.
Figure 9:
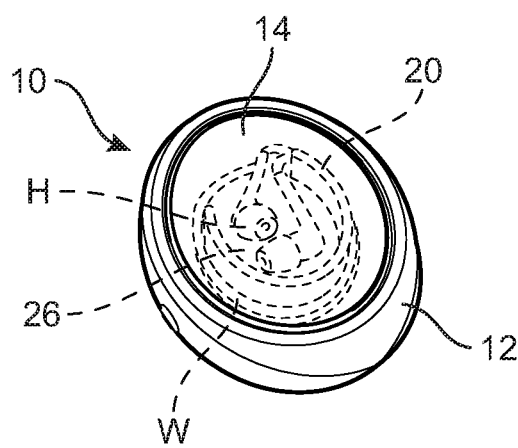
FIG. 9 is a top perspective view of the receptacle of FIG. 5 in a closed configuration containing exemplary stowed contents in phantom lines.

When housing 12 is pivoted about pins 22 about cover member 14, receptacle 10 opens and access to the contents is provided. The fully opened configuration is shown in FIGS. 5, 7, 8, 13D and 14D. As can be seen in these figures, when the housing and cover member are pivoted into the fully opened configuration, cover face 16 and post 20 are exposed, and cover face 18 forms a seat or stage for the contents. The placement of the pins and mating apertures enables cover member 14 to expose the entirety of post 20. In this embodiment post 20 is substantially cylindrical with an opening 26 provided therein. Opening 26 in post 20 may be of any convenient dimension such as between 20 to 90 degrees. As can be seen in FIGS. 5, 7 and 8, a set of earbud headphones may be stowed in receptacle by placing earbuds H into opening 26 so that they are cradled and secured within post 20. The earbud wires W may then be wrapped about post 20 to ensure they are stored in an organized and untangled manner. Once wires W are completely wound about post 20, housing 12 and cover member 14 are pivoted with respect to one another to close receptacle 10. FIG. 9 illustrates the receptacle in a fully closed configuration holding a set of earbud headphones.

Figure 13A:
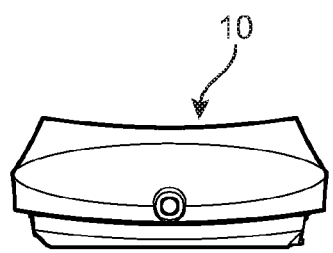
FIGS. 13A-13D are elevational views of the receptacle of FIG. 1 showing the progression between the fully closed configuration of FIG. 13A to the fully opened configuration of FIG. 13D.
Figure 14A:
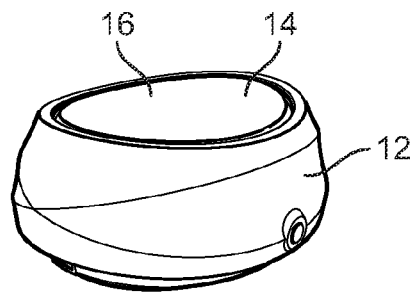
FIGS. 14A-14D are perspective views FIGS. 13A-13D.
Figure 13B:
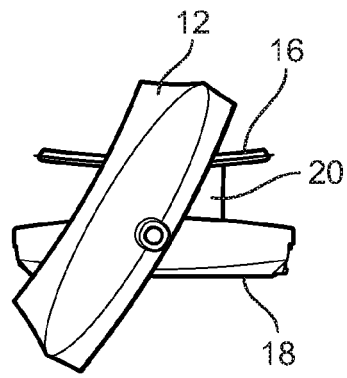
Figure 14B:
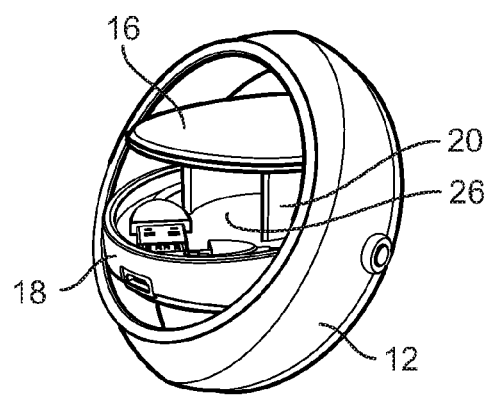
Figure 13C:
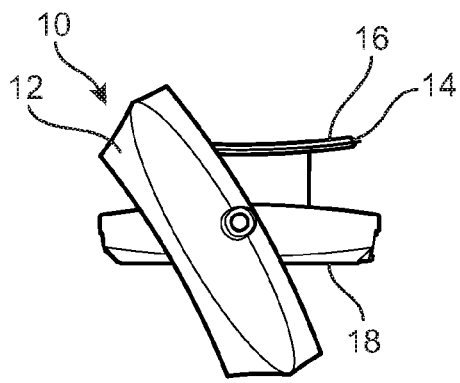
Figure 14C:
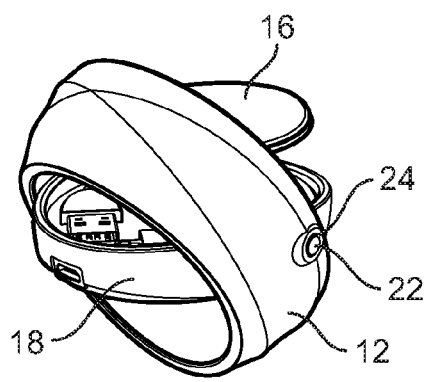
Figure 13D:
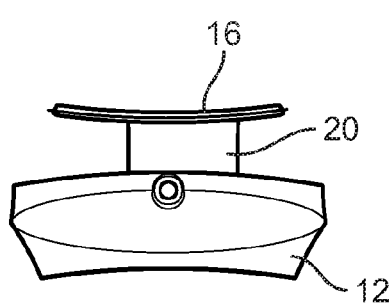
Figure 14D:
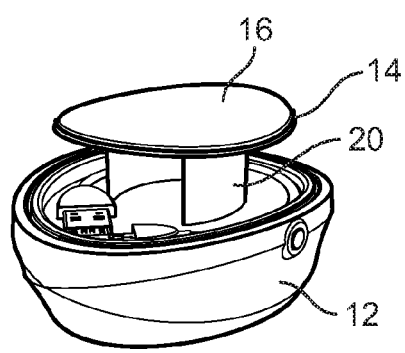
Figure 15:
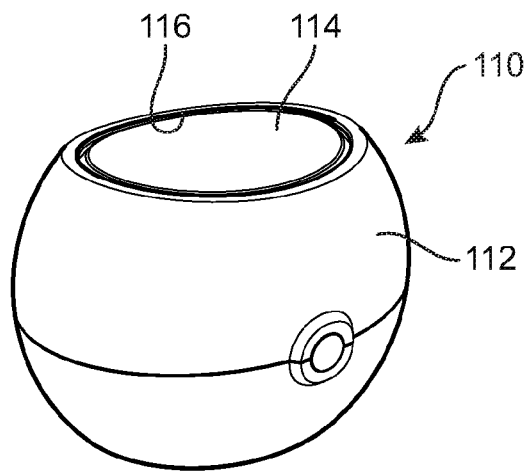
FIG. 15 is a perspective view of another embodiment of the receptacle shown in a closed configuration.
Figure 17:
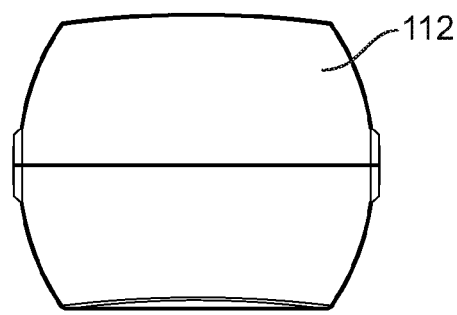
FIG. 17 is a side elevational view of the receptacle of FIG. 15.
Figure 16:
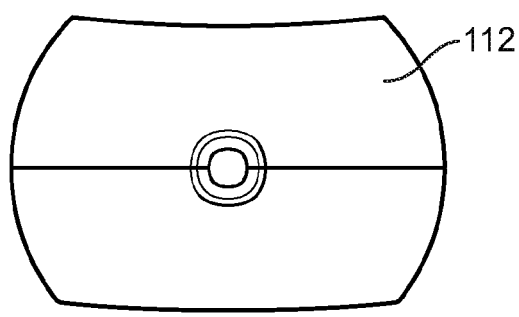
FIG. 16 is a front elevational view of the receptacle of FIG. 15.
Figure 18:
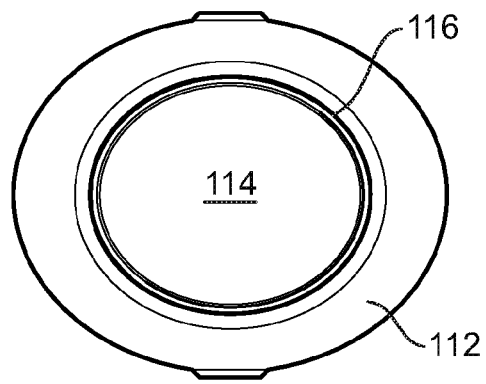
FIG. 18 is a top plan view of the receptacle of FIG. 15.
Figure 19:
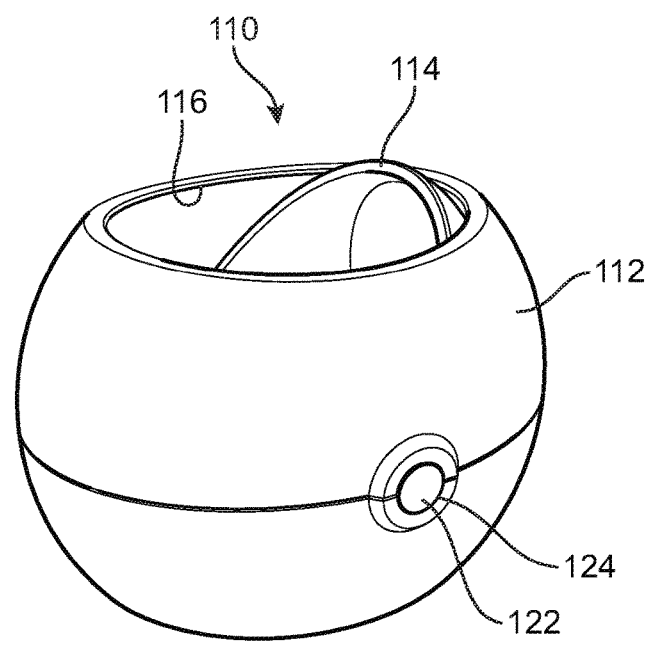
FIG. 19 is a perspective view of the receptacle of FIG. 15 shown in an opened configuration.
Figure 20:
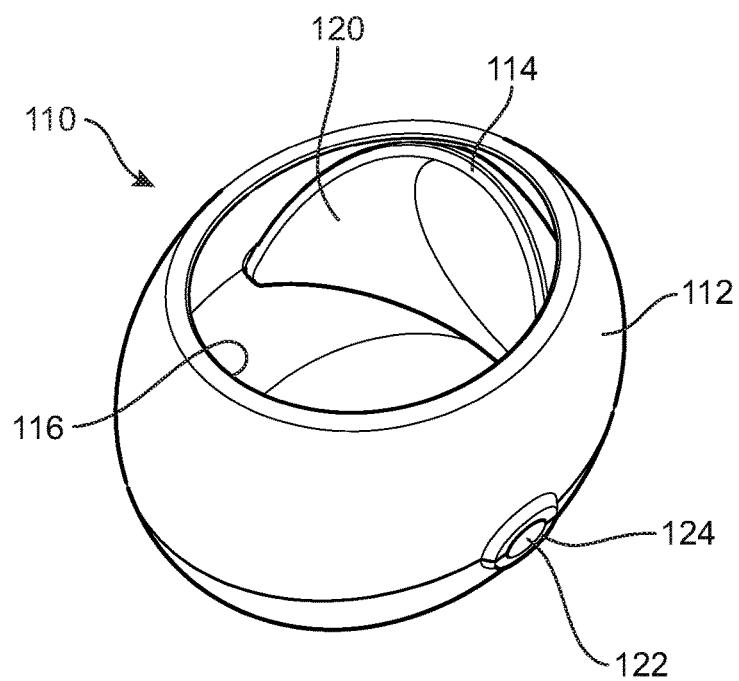
FIG. 20 is a top perspective view of the receptacle in the same opened configuration as FIG. 19.

The pivotable attachment of housing 12 to cover member 14 and the movement of these elements with respect to one another is illustrated in progression in FIGS. 13A-13D and FIGS. 14A-14D. FIGS. 13A and 14A illustrate the receptacle in the fully closed configuration. Similarly FIGS. 13D and 14D illustrate the receptacle in the fully opened configuration. In order to progress from the fully closed to the fully opened configuration, housing 12 must rotate about 180 degrees between these positions about pins 22. If housing 12 were to be rotated in an counterclockwise direction, FIGS. 13B and 14B illustrate the housing 12 pivoted about cover member 14 between about 60 and 90 degrees from the closed position. Assuming a continued counterclockwise rotation, FIGS. 13C and 14C illustrate housing 12 pivoted about cover member 14 between about 90 to 120 degrees from the closed position. When in the fully opened configuration, cover face 16 and post 20 are fully exposed. Opening 26 in post 20 can be seen well in FIGS. 14B and 14D.

Figure 1:
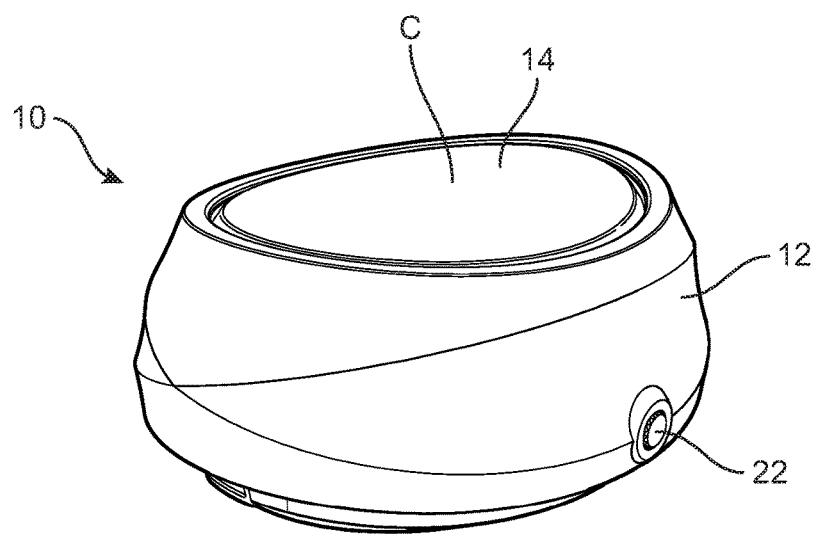
FIG. 1 is a perspective view of a first embodiment of a receptacle shown in a closed configuration.
Figure 2A:
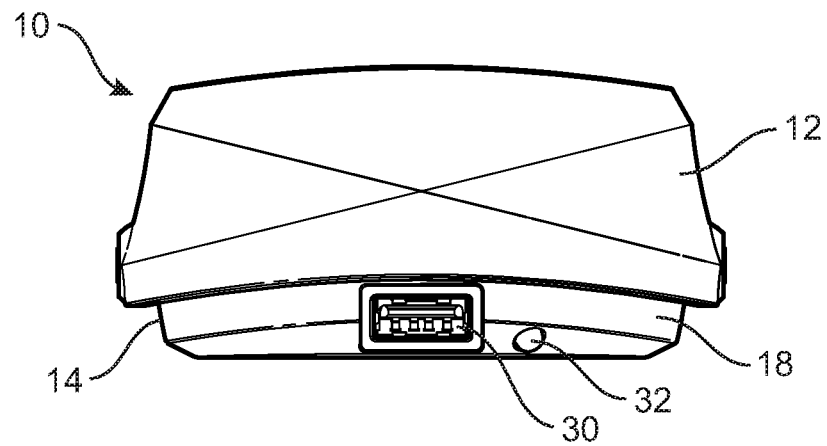
FIG. 2A is a rear elevational view of the receptacle of FIG. 1 shown in a closed configuration.
Figure 2B:
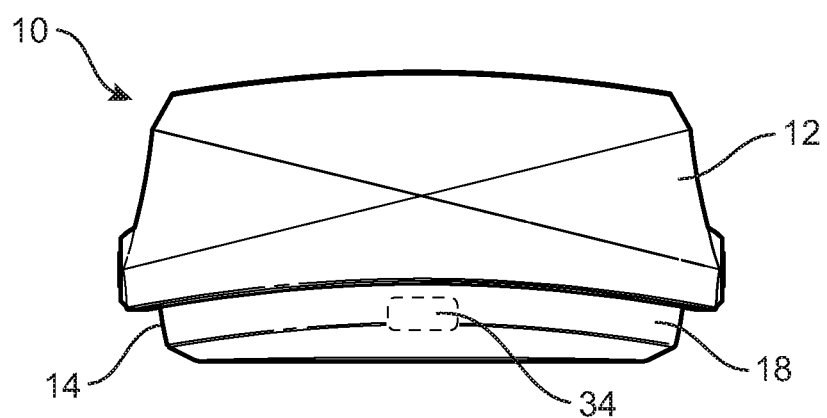
FIG. 2B is a front elevational view of the receptacle of FIG. 1 shown in a closed configuration.

If the receptacle is used for stowing earbuds or other electronics accessories, it is possible to provide a charging cable or even a spare power source in receptacle 10. FIGS. 2A and 2B illustrate the rear and front views of the receptacle in a closed configuration. In the illustrated embodiment, FIG. 5, a spare charging cable F may be provided onboard the receptacle. One way to provide storage for cable F is to provide an area on cover member 14, such as by way of an impression cut-out 28 on the interior of cover face 18. If a power source such as a spare onboard battery were provided in receptacle 10, a charging port 30 may be provided. The charging port may be of any suitable configuration such as a USB port. In the illustrated embodiment, charging port 30 is provided on the rear of cover face 18 such that cover face 18 could be integrated with a spare battery cell or cells. Cable F could then be used in conjunction with charging port 30 to charge a personal electronic device such as a smartphone or music player shown in phantom lines in FIG. 6. A power button and indicator light 32 may be provided near charging port 30 to selectively enable or disable charging from the on-board battery. In the illustrated embodiment, the power button is also an indicator light to provide visual confirmation that the on-board battery is in use. The indicator light may be employed to indicate charging state or battery level of the on-board battery: such as glowing green when the available charge is high, glowing amber when available charge is waning, and glowing red the battery is almost depleted. Any known type of indicator such as an LED may be employed for the indicator light.

Figure 6:
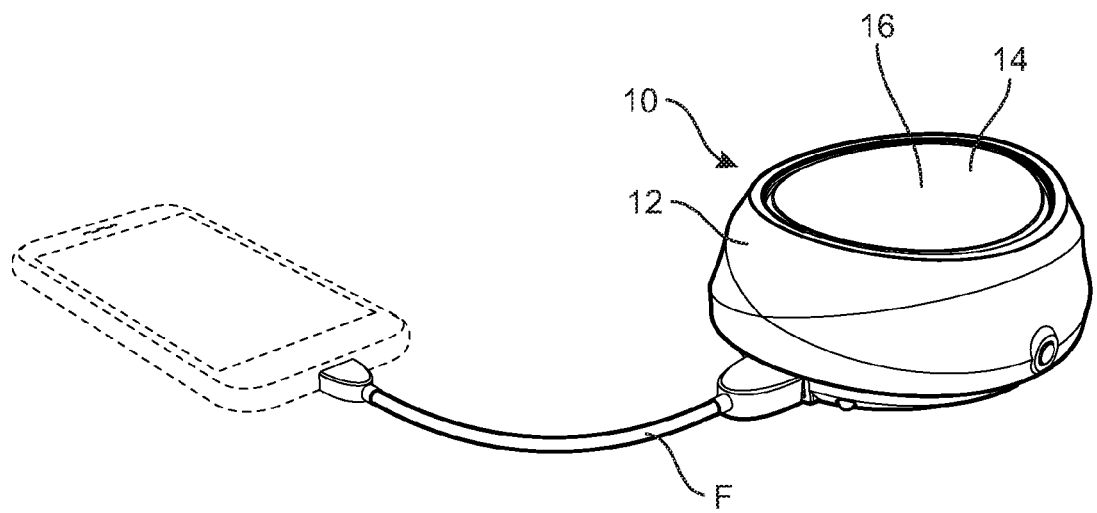
FIG. 6 is a perspective view of the receptacle of FIG. 1 shown in a closed configuration with an exemplary article.

Charging port 30 near indicator light 32 are illustrated on one side of the receptacle as seen in FIG. 2A. Charging port 30 may be an output charging port as seen in FIG. 6 charging a device from an onboard battery. Receptacle 10 may also be equipped with an input charging port 34 on another side as shown in FIG. 2B. Input charging port 34 may be used to charge the onboard battery cell(s) built into cover 14.

If receptacle 10 is scaled for stowing and carrying earbud headphones, its size may be determined by the space needed for the headphones and onboard battery. As seen in FIG. 3, the illustrated embodiment has a slightly oval footprint. A range of exemplary dimensions for an earbud case, with reference to FIG. 3, may be 76-86 mm across a minor axis (vertical in FIG. 3, coinciding with line C); 90-100 mm across a major axis (horizontal in FIG. 3 and perpendicular to line C); and 34-44 mm tall (the distance between H1 and H3). These dimensions are exemplary only and do not limit the scale or proportions of the receptacle.

Receptacle 10 provides aesthetically pleasing and functional protection for carrying and storing articles. In addition to the detent mechanism, the receptacle is designed so that its very shape and configuration in the closed position will tend to keep it closed. Closed receptacle 10 inside of a pocket or bag will tend to stay closed. In a close fitting pocket, such as on a garment, it would be virtually impossible for receptacle 10 to accidentally open or spill its contents. This enables the contents to be protected and isolated from the environment outside of the receptacle. The article contained will be stored in an organized manner and any wires or other pieces will be protected from fraying or tangling.

In another exemplary embodiment, receptacle 110 comprises a housing 112 and a cover member 114 which are pivotally connected to one another. Receptacle 110 may have a variety of shapes and configurations, and in the illustrated embodiment, FIGS. 15-24C, housing 112 has a general capsule shape. Cover 114 covers an opening 116. Cover 114 generally has a cover face 118 and opposing flanges 120. Cover 114 is pivotably attached to housing 112 by way of pins 122 mating with apertures 124. In the illustrated embodiment, pins 122 are provided on cover member 114, and apertures are provided in housing 112, however, as described above, pins 122 and apertures 124 may be reversed on housing and cover member 114, respectively. Pins and apertures are again provided in alignment through a centerpoint of the housing. FIGS. 15-18, 21A, 22A, 23A and 24A illustrate cover member 114 in the fully closed configuration. When fully closed, cover face 118 completely covers opening 116 in housing 112. FIGS. 19, 20, 21C, 21E, 22C, 22E, 23B, 23C, 24B and 24C illustrate cover 114 in the fully opened configuration. When fully opened, cover 114 is rotated downward into housing 112 such that opening 116 is almost fully opened. FIGS. 21B, 21D, 22B, and 22D illustrate cover member 114 in a partially opened configuration.

Figure 21A:
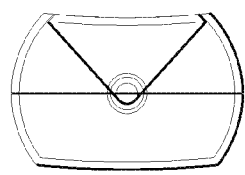
FIGS. 21A-21E are elevational views of the receptacle of FIG. 15 showing the progression between the fully closed configuration of FIG. 21A to the fully opened toward the left configuration of FIG. 21C and the fully opened to the right configuration of FIG. 21E.
Figure 22A:
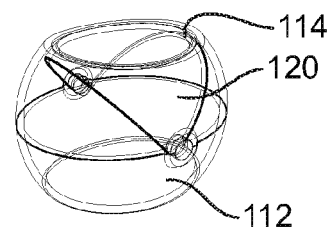
FIGS. 22A-22E are perspective views corresponding to FIGS. 21A-21E.
Figure 21B:
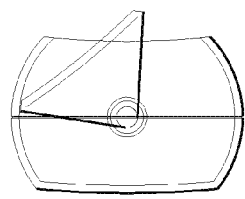
Figure 22B:
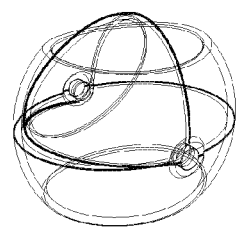
Figure 21C:
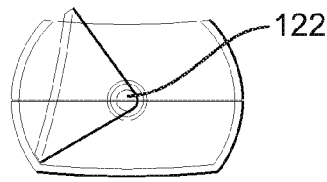
Figure 22C:
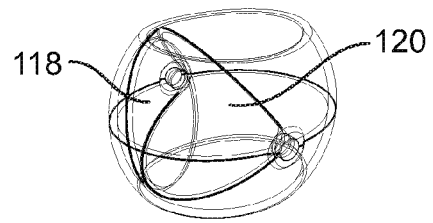
Figure 21D:
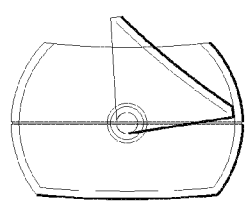
Figure 22D:
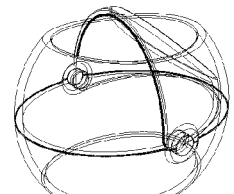
Figure 21E:
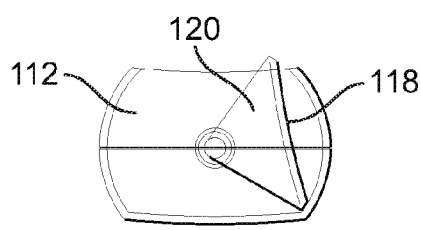
Figure 22E:
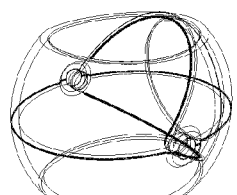
Figure 23A:
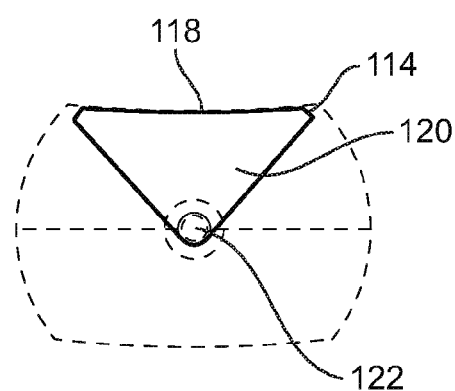
FIGS. 23A-23C are schematic elevational views of the cover of the receptacle of FIG. 15 shown in the fully closed configuration of FIG. 23A, the fully opened to the left configuration of FIG. 23B and the fully opened to the right configuration of FIG. 23C.
Figure 24A:
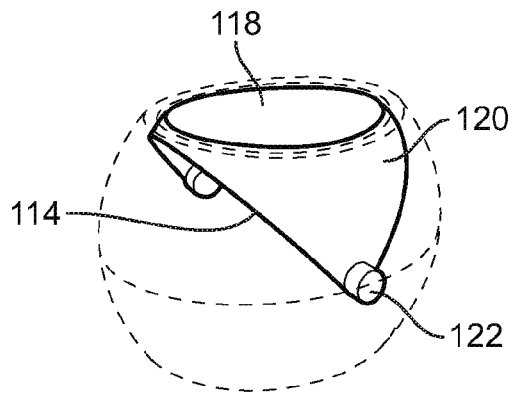
FIGS. 24A-24C are schematic perspective views corresponding to FIGS. 23A-23C.
Figure 23B:
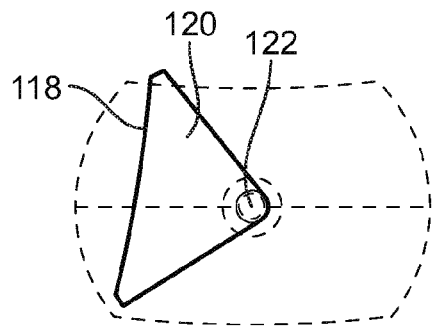
Figure 24B:
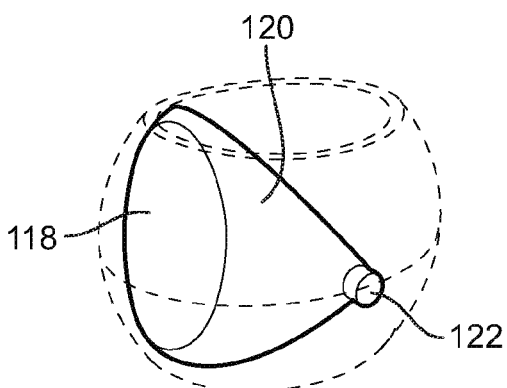
Figure 23C:
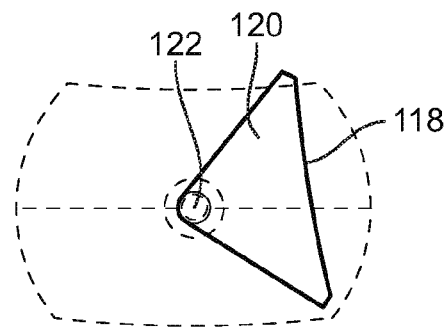
Figure 24C:
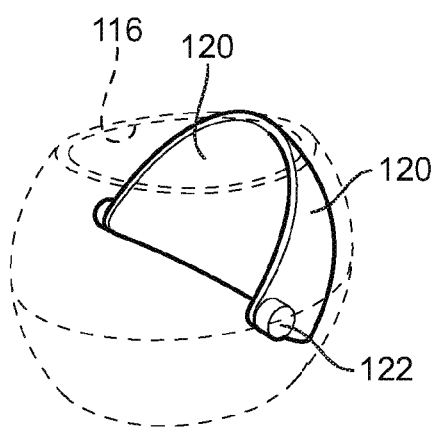
Figure 25:
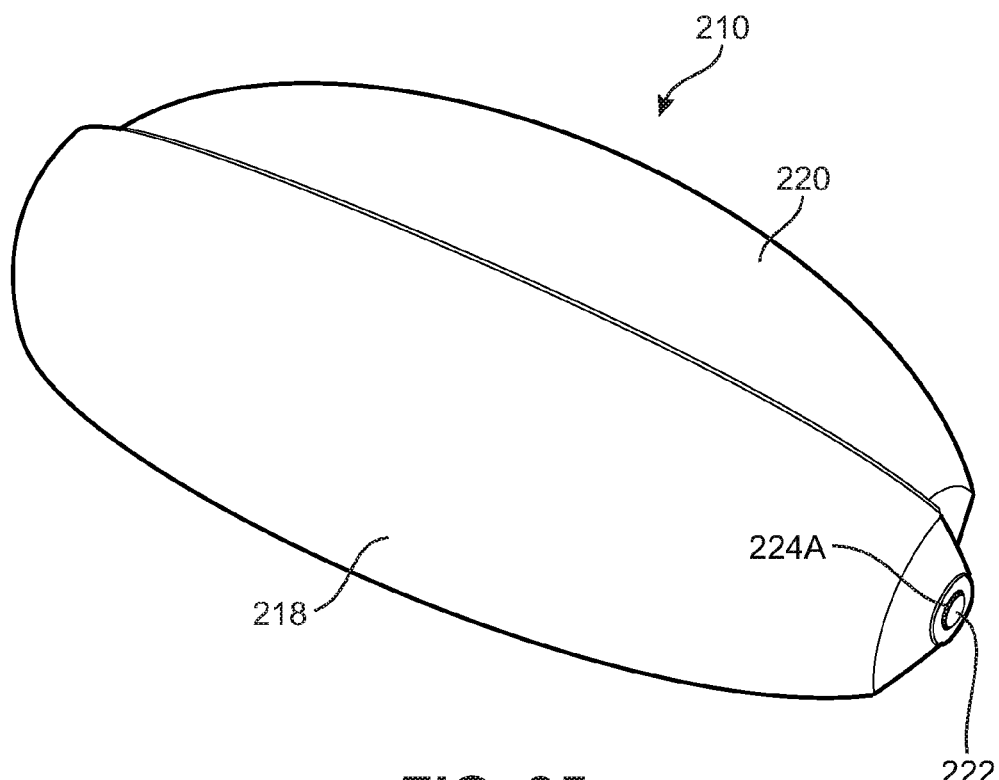
FIG. 25 is a perspective view of another embodiment of the receptacle shown in a closed configuration.

FIGS. 21A-21E and 22A-22E illustrate the progression of the cover member pivoting from the fully closed position, FIGS. 21A and 22A to the fully opened positions FIGS. 21C and 21E and 22C and 22E by pivoting in either direction, FIG. 21B or 21D, and 22B or 22D. FIGS. 23A-23C and 24A-24C illustrate cover member 114 in various positions with the housing shown in phantom line for clearer understanding. A detent mechanism between the housing and cover member that is analogous to the one illustrated in FIGS. 11 and 12 may be provided to ensure that the cover is locked into either the opened or closed positions, and provide sensory certainty to the user of these positions. As described above, the elements of the detent mechanism may be positioned to provide a locked, and fully engaged relationship of the protrusion and mating recess in any desired arrangement, such as the fully opened or fully closed configuration.

Receptacle 110 may be used for any type of article which must be securely stowed or carried. Examples of such are jewelry, medicine, accessories, food, candy, utensils, tools, cosmetics, and the like. The configuration of receptacle 110 may also be useful on a larger scale for larger articles. Any type of article which must be protected from the surrounding environment may be stowed in receptacle 110.

In another exemplary embodiment, the receptacle is designed for holding eyeglasses or sunglasses, or another article with a length dimension greater than the width dimension, FIGS. 25-32C. Receptacle 210 comprises a housing 212 and a cover member 214 attached to one another in pivoting arrangement. Housing 212 may have a major axis X and a minor axis Y to provide a generally oblong footprint. Housing 212 has an opening 216 which is covered by cover 214. Cover 214 may have two leaves, an outer leaf or segment 218 and an intermediate leaf or segment 220 pivotably attached to one another and to housing 212 by pins 222 and mating apertures 224A and 224B. In the illustrated embodiment, pins 222 are aligned parallel to the major axis X and provided on housing 212. Mating apertures 224A and 224B are provided on outer leaf 218 and intermediate leaf 220, respectively, to receive the pins 222 and enable the cover member leaves 218 and 220 to pivot about the pins to alternately close or expose opening 216. As seen in the drawings, as the cover member is opened, outer leaf 218 pivots about the pins and overlays intermediate leave 220, and the two layered leaves then overlay the portion of housing 212 to the rear of the opening. When fully opened, opening 216 is exposed, and the outer leaf and intermediate leaf are in layered and nested relation to one another and to the rear wall 213 of housing 212.

Figure 31A:
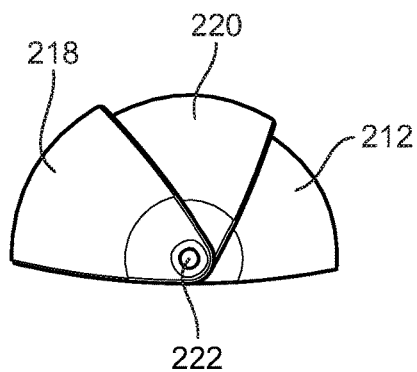
FIGS. 31A-31C are end elevational views of the receptacle of FIG. 25 showing the progression from the fully closed configuration of FIG. 31A to the fully opened configuration of FIG. 31C.
Figure 32A:
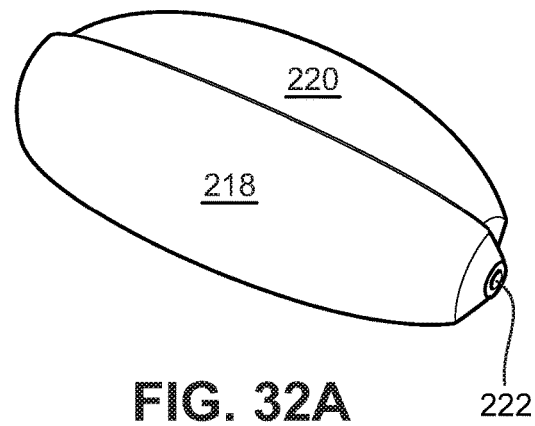
FIGS. 32A-32C are perspective views corresponding to FIGS. 31A-31C.
Figure 31B:
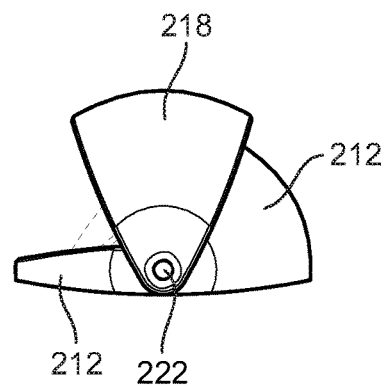
Figure 32B:
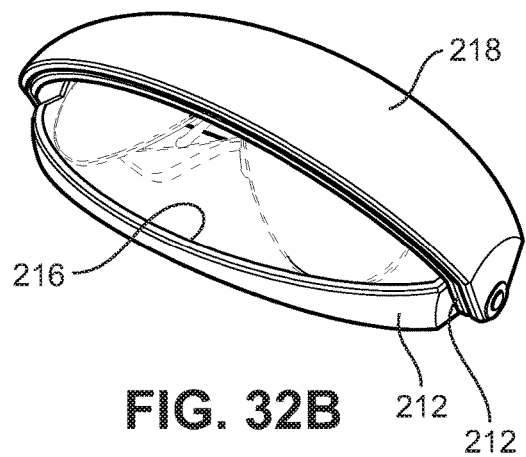
Figure 31C:
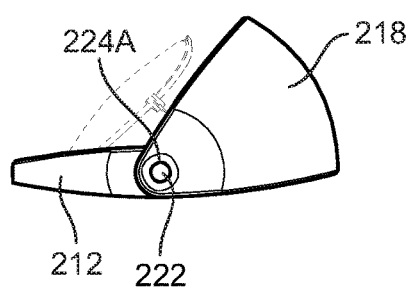
Figure 32C:
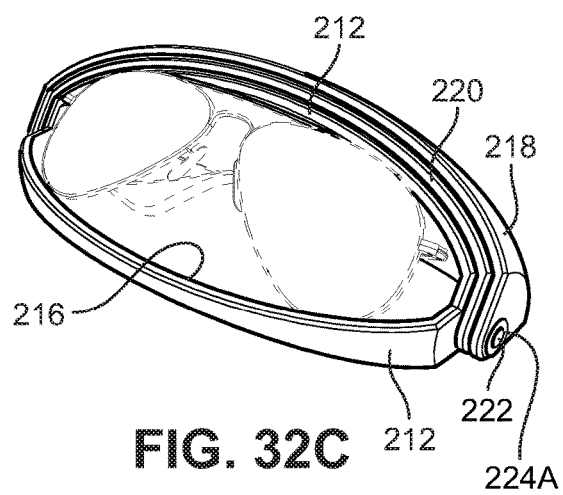

The progression of the pivoting movement of the cover member 214 relative to housing 212 is shown in FIGS. 31A-31C and FIGS. 32A-32C, ranging from a fully closed position in FIGS. 31A and 32A to a fully opened position in FIGS. 31C and 32C. FIGS. 31B and 32B show outer leaf 218 overlapping and covering intermediate leaf 220. In the illustrated embodiment, pins 222 are provided on housing 212 to mate with and rotatably engage in apertures 224A and 224B provided in leaves 218 and 220, respectively. It is also possible to provide the pins on the outer leaf to engage mating apertures provided in the intermediate leaf and the housing. A detent mechanism analogous to the one described herein may be provided with the pin and aperture arrangement to provide locking stops of full engagement of detent protrusions and recesses. Of course since the cover member in this embodiment comprises two leaves, a detent mechanism may be provided between any two elements movable relative to one another. That is, a detent mechanism may be provided between housing 212 and intermediate leaf 220; and a separate detent mechanism may be provided between intermediate leaf 220 and outer leaf 218. Each such detent mechanism would be designed to provide the desired locked orientation of the elements with respect to one another. For example, the detent mechanism between any two elements may include fully engaged locking positions for an opened configuration and a closed configuration. The detent mechanism may also provide for other locked positions as desired.

Figure 26:
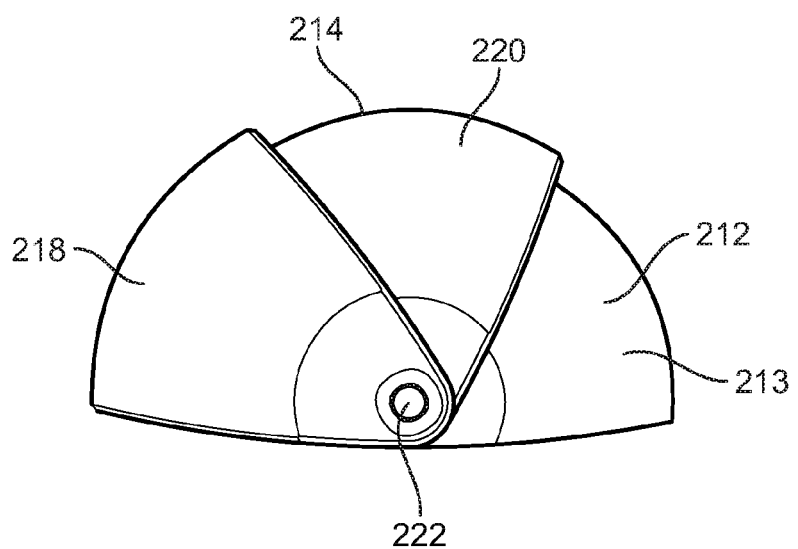
FIG. 26 is an end elevational view of the receptacle of FIG. 25.
Figure 27:
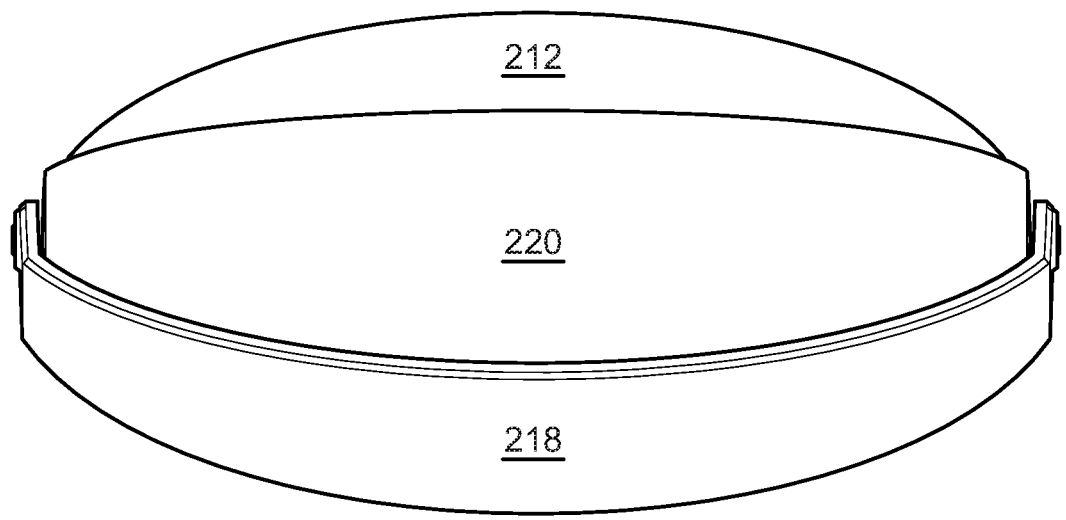
FIG. 27 is a top perspective view of the receptacle of FIG. 25.
Figure 28:
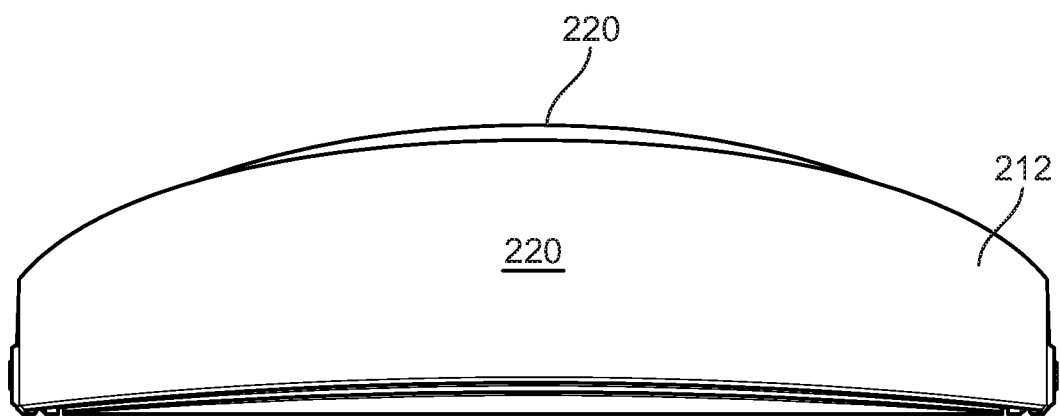
FIG. 28 is a front elevational view of the receptacle of FIG. 25.
Figure 29:
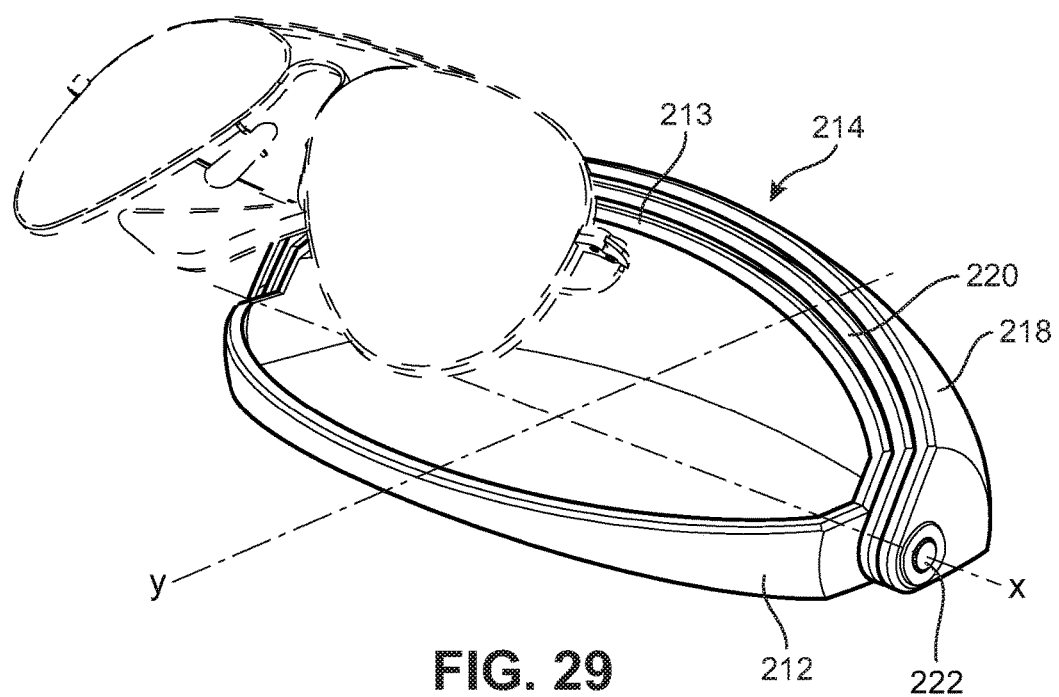
FIG. 29 is a perspective view of the receptacle of FIG. 25 shown in an opened configuration receiving an exemplary article.
Figure 30:
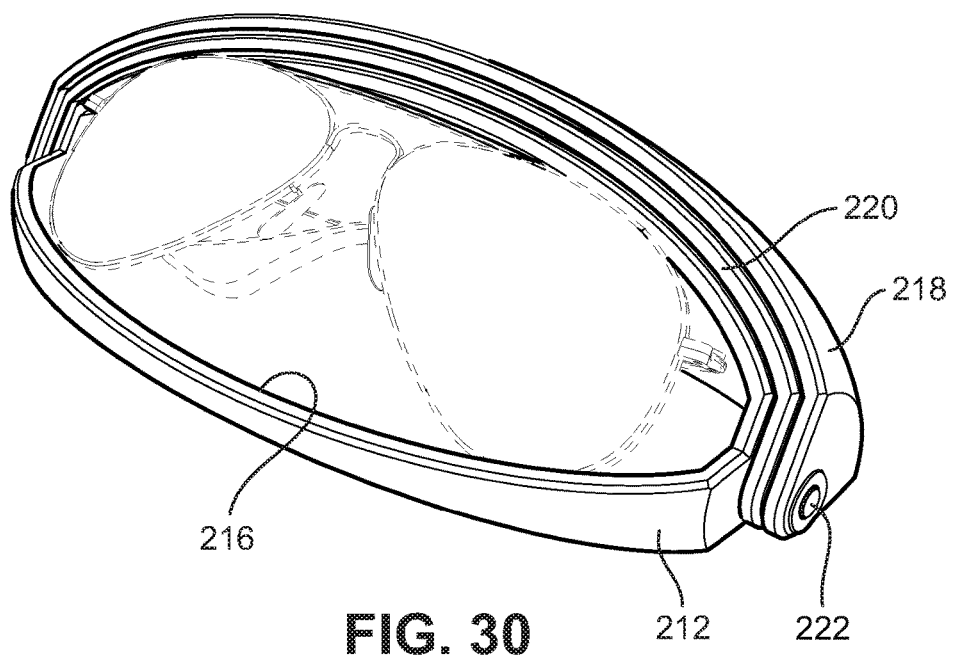
FIG. 30 is a perspective view of the receptacle of FIG. 29 shown in an opened configuration stowing an exemplary article.

In the illustrated embodiment, receptacle 210 may be employed to stow a pair of eyeglasses. An exemplary range of dimensions for this use, with reference to FIG. 29, may be 170-180 mm from end to end along the X-axis; 80-90 mm from side to side along the Y-axis; and between 45-55 mm in height as seen in FIG. 26. These dimensions are exemplary only and do not limit the scale or proportions of the receptacle This type of receptacle and cover may be employed for a variety of items. Other possibilities include, but are not limited to, jewelry cases; cosmetic cases; topical drug containers; personal care item cases; food or confection containers; pencil cases; smaller scale hardware cases such as for nails, screws, tacks, nuts, etc.; tool cases; flash memory card cases; memento cases; baby accessories such as pacifiers, pins, etc.; pill boxes; cigarette cases; tobacco, snuff or herb containers; sporting accessories; game pieces; sewing notions; and other compounds or accessories which need to be contained, carried, sorted, separated, or protected from exposure, loss or damage.

The receptacle may also be a reusable, environmentally advantageous shipping and/or storage container for sensitive micro-electronic components, or other industrial components prior to assembly. The housing and/or cover may be engineered to interface with automated manufacturing or article handling devices or lines to present the contents in an advantageous and efficient configuration in an assembly line or shipping sequence. Likewise, the receptacle may be a sterile container for medical or dental devices or implements, and the shell or cover may be engineered to provide optimal positioning of the contained devices for the users or medical or dental professionals. In this context like others, it is possible that the shell or cover could be engineered with interchangeable inserts or the like, similar to the cable management imprint of FIG. 5, to handle and hold a variety of devices or implements, thereby encouraging the reusability of the receptacle.

Although the illustrated embodiments generally depict and describe smaller scaled receptacles, it is contemplated to be within the scope of the invention to scale the receptacle for larger items. Some possible applications for larger items include, but are not limited to, larger tools or implements; a one use or reusable container for sensitive industrial parts that need protection before or after assembly; household items; electronics such as cameras, smart phones; or any other larger item that may need to be contained, carried, sorted, separated or protected from exposure, loss or damage include.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A receptacle comprising:
a generally cylindrical housing with opposing open ends;
a cover having first and second portions connected to one another by a connecting member, said cover pivotably attached to said housing to move between a closed position in which the opposing open ends of said housing are closed by said first and second portions of said cover, and an open position in which one of said open ends is not closed by said cover;
a locking structure provided between said housing and said cover for locking said receptacle in the closed position or the open position.

2. The receptacle of claim 1, wherein said first portion of said cover is mounted to said housing by integral, opposing pivot pins such that said cover is pivotably attached to said housing to rotate about said pivot pins.

3. The receptacle of claim 2, wherein said pivot pins are integrally formed on said first portion of said cover and mate to corresponding apertures on said housing.

4. The receptacle of claim 2, wherein said pivot pins are integrally formed on said housing and mate to corresponding apertures on said first portion of said cover.

5. The receptacle of claim 2, wherein said pivot pins form a hinge axis on said second portion of said cover offset from a vertical center plane of said housing.

6. The receptacle of claim 5, wherein said pivot pins are provided on said housing to mate with pin apertures provided on said second portion of said cover.

7. The receptacle of claim 1, wherein said locking structure comprises a detent mechanism.

8. The receptacle of claim 7, wherein said detent mechanism comprises a protrusion and a mating recess.

9. The receptacle of claim 1, wherein said connecting member has a spool shape adapted for wire management.

10. The receptacle of claim 9, wherein said connecting member includes a cradle adapted for retaining an article.

11. The receptacle of claim 1, further comprising a rechargeable power source mounted on said cover.

12. The receptacle of claim 1, further comprising a cord management recess in said cover.

13. An electronics cord management receptacle comprising:
a spool having a spool pin extending between a free spool cap, and an attached spool cap, the spool pin adapted for retaining a wound cord thereof; and
a tubular cover member having opposing open ends, each said open end defining a terminal edge, said cover member pivotally attached to said attached spool cap such that in a closed position said spool caps are generally flush with the terminal edges of said tubular cover member and said spool pin is disposed within said cover member, and in an open position, said spool is pivoted about the cover member such that said attached spool cap is flush with one of said terminal edges of said tubular cover member and said free spool cap and said spool pin are disposed outside of said cover member.

14. The cord management receptacle of claim 13, further comprising a detent mechanism to provide a rotational limit of movement of said spool relative to said cover member.

15. The cord management receptacle of claim 13, wherein said attached spool cap is pivotally attached to said cover member by diametrically opposed pivot pins and mating apertures.

16. The cord management receptacle of claim 15, wherein said pivot pins are disposed on said attached spool cap, and said mating apertures are disposed on said cover member.

17. The cord management receptacle of claim 15, wherein said pivot pins are disposed on said cover member, and said mating apertures are disposed on said attached spool cap.

18. The cord management receptacle of claim 13, further comprising a cavity disposed on interior surface of said attached spool cap for storing a cable therein.

19. A receptacle comprising: a tubular housing having opposing open ends adapted to contain an object;
- a cover member pivotally attached to said housing and adapted to move between a closed position in which the housing is sealed and any object therein is protectably contained, and an open position in which the housing is opened and any object therein is accessible, wherein said cover member is attached to said housing on diametrically opposed pivot points by pivot pins and mating apertures; and
- a stop mechanism associated with said housing and said cover member to provide tactile confirmation of either the closed position or the open position.

\* \* \* \* \*